United States Patent [19]

Ancker et al.

[11] 4,409,342

[45] Oct. 11, 1983

[54] SYNERGISTIC REINFORCEMENT PROMOTER SYSTEMS FOR FILLED POLYMERS

[75] Inventors: Fred H. Ancker, Warren Township, Plainfield County; Arnold C. Ashcraft, Jr., Hightstown, both of N.J.; Eric R. Wagner, deceased, late of Basking Ridge, N.J.; by Maria M. Wagner, executrix, Princeton, N.J.

[73] Assignee: Union Carbide Corporation, Danbury, Conn.

[21] Appl. No.: 295,813

[22] Filed: Aug. 27, 1981

[51] Int. Cl.³ ............... C08K 3/10; C08K 3/34; C08K 3/26
[52] U.S. Cl. .................... 523/202; 523/200; 523/201; 523/203; 523/212; 523/213; 523/215; 523/216; 524/425; 524/437; 524/445; 524/451
[58] Field of Search ........... 523/215, 201, 213, 216, 523/202, 203, 212, 200

[56] References Cited

U.S. PATENT DOCUMENTS 3,471,439  10/1969  Bixler et al. ............. 523/202
3,969,308  7/1976  Penneck ................... 523/212

OTHER PUBLICATIONS

Derwent Abst. 24909e/13 J57030732 (2-82).
Derwent Abst. 70727c/40 J55110138 (8-80).
Derwent Abst. 93735d/51 J56142037 (11-81).
Derwent Abst. 24908e/13 J57030731 (2-82).
Derwent Abst. 85285c/48 JS5133438 (10-80).
Derwent Abst. 33208c/19 FR2432033 (3-80).
Derwent Abst. 88139d/48 J56133140 (10-81).
Derwent Abst. 90276d/49 J56137937 (10-81).
Derwent Abst. 91936d/50 (J56139927) (10-81).

*Primary Examiner*—Lewis T. Jacobs
*Assistant Examiner*—Herbert J. Lilling
*Attorney, Agent, or Firm*—Henry H. Gibson; Bernard Francis Crowe

[57] ABSTRACT

A reinforced, filled hydrocarbon polymer composition, having increased strength and ductility, contains synergistic mixtures of at least two copolymerizable interfacial agents including an adsorbable agent and a soluble agent.

7 Claims, 1 Drawing Figure

4,409,342

SYNERGISTIC REINFORCEMENT PROMOTER SYSTEMS FOR FILLED POLYMERS

CROSS-REFERENCE TO RELATED APPLICATIONS

This application is related to copending patent applications Ser. No. 295,812, entitled "Integral Additives and Methods for making Filled Thermoplastics", and Ser. No. 295,811, entitled "Reinforcement Promoters for Filled Thermoplastic Polymers", now U.S. Pat. No. 4,385,136 (Ancker et al.), issued May 24, 1983, both filed concurrently with this application.

BACKGROUND OF THE INVENTION

1. Field of the Invention

This invention relates to a filled, hydrocarbon polymer composition containing a synergistic mixture of at least two interfacial agents which have a reinforcement promoting effect on the filled polymer. Reinforcement promotion refers to the simultaneous increase in tensile strength and ductility properties of a filled polymer composition.

2. Description of the Prior Art

A broad range of chemicals have been evaluated as filler treatments or interfacial agents in filled polymers with and without the addition of free radical initiators, such as peroxides. Unfortunately, the literature terminology is usually ambiguous and often erroneous. For example, the terms "coupling agent" or "adhesion promoter", which imply that the additives increase the adhesion or bonding between the filler particle and the surrounding polymer matrix, are often used uncritically. Usually there is no proof of any adhesion effect, and the particular additive may function merely as a filler dispersing aid and, sometimes, as a processing aid by reducing the viscosity of the molten, filled composite. In many cases, the mechanical properties reported for the filled composites even imply that the additive facilitates release of the matrix polymer from the filler particles, such that the so-called coupling agent actually has a decoupling or debonding effect.

Figure 1:
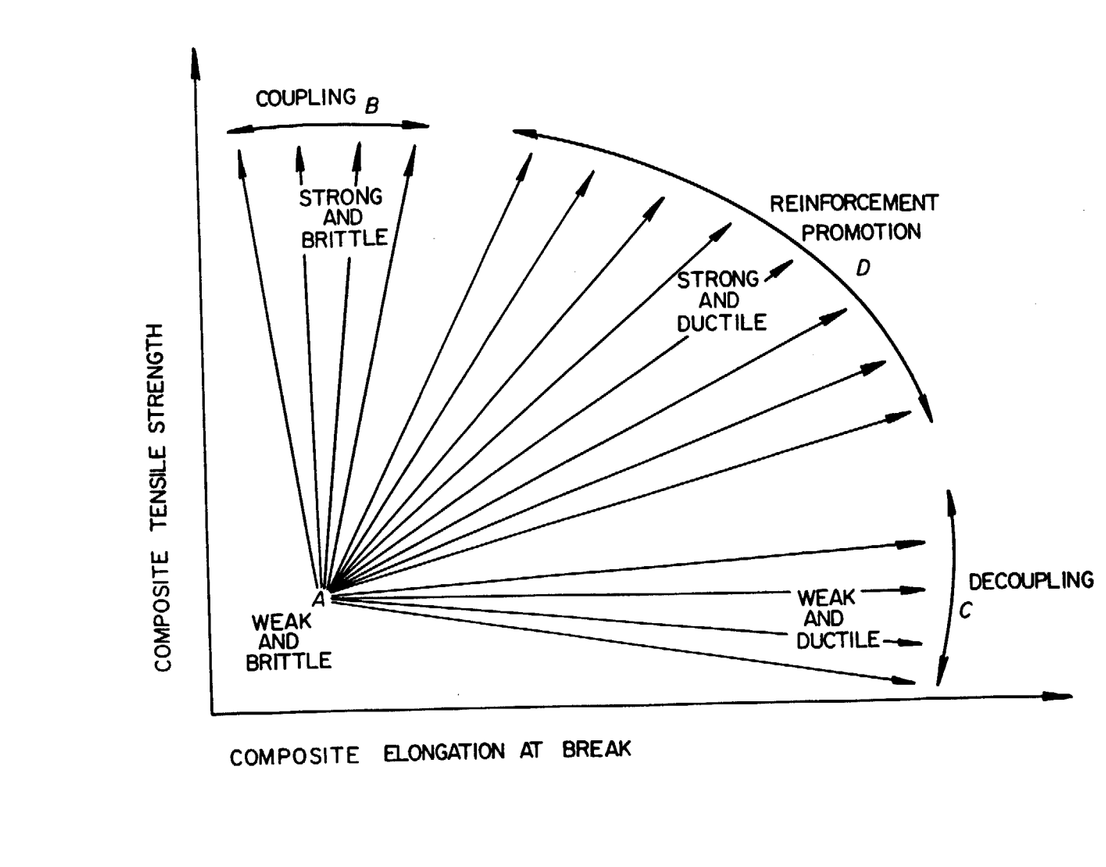
The FIGURE is a diagram portraying the properties of an embodiment of the present invention, as compared with properties of embodiments as disclosed in the prior art.

The varied behavior of filler treatment additives in filled polymers may be more clearly envisioned with the help of a composite property chart such as that shown in the FIGURE. On this chart, the abscissa or "x" axis represents the elongation at break and the ordinate or "y" axis represents the maximum tensile strength of a filled polymer.

The interfacial agents which fall in the area around "A" in the FIGURE are ineffective and the mechanical properties of a filled polymer composition are essentially unchanged from those of a controlled composition without any interfacial agent. In general, these compositions have little, if any, practical interest in and of themselves.

Certain currently used interfacial agents and filler treatments result in increases in tensile strength with little or no increase in elongation at break, such that although the materials get stronger, they remain brittle. These compositions are grouped in the area from "A" to "B" and the corresponding interfacial agents will here be called coupling agents in the strict sense of the word. This area is rather sparsely populated, usually by coupling agents which have been developed specifically to provide adhesion for a particular polymer and substrate combination. Increased interfacial adhesion, i.e., coupling, is believed to be responsible for the increased tensile strength, but the polymer matrix still has to accommodate the strain of the total composition, such that the ductility is usually improved only slightly, and sometimes even reduced. The compositions in the area from "A" to "B" in the Figure can, therefore, occasionally be of practical value, especially in cases where the virgin, i.e., unfilled, polymer has high ductility so that the filled polymer still obtains a useful combination of mechanical properties.

Other commonly used additives result in gains in elongation break with little changes, or even decreases, in tensile strength, such that although such compositions can be more ductile, they remain weak, and are often best characterized as "cheesy". These compositions are grouped in the area from "A" to "C", and the corresponding interfacial agents will here be termed decoupling agents. These compositions are fairly well represented by many so-called lubricants, processing aids, detergents, waxes and the like. The low interfacial adhesion is believed to be the principal reason for these characteristics in contrast to the composites in the area from "A" to "B". In this case, the load-bearing capability is impaired because the filler particles contribute little, if anything, to load capacity, since they separate from the matrix at the application of very modest loads. On the other hand, this microcavitation effect, which often is visible as stress-whitening, reduces the actual matrix strain, such that the compositions can have substantially improved ductility. The compositions in this area may be useful for non-load bearing applications, such as where a plastic part is overdesigned from a stress standpoint. The improved ductility can be very useful for parts which must be able to withstand high impact loads without fracturing, but would be useless for structural applications, especially those requiring resistance to creep during long term static loading.

Clearly, the interfacial agents which cause a filled polymer to become both strong and tough, i.e., which cause improvements in both tensile strength and elongation at break, are by far the commercially most attractive compounds. These compositions would be grouped in the area from "A" to "D", which is the least populated area in the FIGURE. The interfacial agents in this area are the ones which have been termed "reinforcement promoters". These materials are commercially very valuable because they can be used broadly to formulate filled thermoplastic compositions for applications requiring both load-bearing capability with resistance to creep, and at the same time requiring toughness, i.e., resistance to fracture by impact load. Furthermore, filled polymers in this area are often much less expensive in terms of raw material costs than are unfilled, engineered polymers, which they would be capable of replacing.

Not all interfacial agents can be clearly defined as reinforcing, coupling, decoupling, or ineffective since, as can be seen from the FIGURE, no sharp boundaries exist between the designated areas. This is particularly evident for agents providing only modest increases in strength or elongation at break, i.e., which approach the area around "A" in the FIGURE, or where the reinforcement promotion is attempted under low sensitivity conditions such as for compositions having relatively low filler loadings. This ambiguity, however, does not detract from the facts that there are highly effective agents in each of the three areas, out to "B", "C" and "D", in the FIGURE; that these agents differ greatly in how they affect the properties of a filled polymer; and that these differences are of considerable commercial importance. In addition, while some effects are commonplace and not of much practical interest, other effects are quite difficult to achieve and at the same time highly desirable. An improvement in the area of reinforcement promotion for filled polymers is presented in copending patent application Ser. No. 295,811, entitled "Reinforcement Promoters for Filled Thermoplastic Polymers", now U.S. Pat. No. 4,385,136 (Ancker et al.), issued May 24, 1983, filed with this application and is incorporated by reference herein. The present invention is a further improvement in reinforcement promotion of filled polymers.

SUMMARY OF THE INVENTION

The present invention relates to a composition comprising a hydrocarbon polymer, an inorganic filler, and two interfacial agents wherein:

(a) said agents are capable of copolymerization with each other;

(b) at least one agent contains at least one reactive olefinic double bond capable of mechanico-chemical grafting to the polymer;

(c) one agent is more highly adsorbable onto the filler surface while the other agent is more highly soluble in the filled polymer; and (d) said agents have a synergy index, S, being greater than zero, which is defined by the formula:

$$S = 50(Q_A + Q_S - 0.2)(1 - 10R_f)(0.5 - \Delta^2)$$

wherein $Q_A$ and $Q_S$ are the Alfrey-Price resonance parameters of the most reactive olefinic double bonds in the adsorbable and soluble agents, respectively; $R_f$ is the relative flow ratio of the adsorbable agent measured by thin layer chromatography on a neutral silica gel using xylene as the eluant and di-n-butyl fumarate as the standard, and $\Delta$ is the the difference between the Hildebrand solubility parameter of the soluble agent and that of the polymer. The present invention also relates to a process for producing the reinforced filled polymer composition.

DETAILED DESCRIPTION OF THE INVENTION

Hydrocarbon Polymer

The invention relates to filled hydrocarbon polymers whose strength and ductility properties are improved by the addition of certain reinforcement promoters. A preferred group of hydrocarbon polymers responsive to the interfacial agents of this invention are the normally solid hydrocarbon polymers comprising the polyalkenes, such as the polymers and copolymers of ethylene, propylene, butene, hexene, neohexene and 4-methyl pentene. These polymers may further contain residual unsaturation enabling subsequent curing or cross-linking as can be achieved, for example, by co- or terpolymerization with diene monomers such as norbornadiene. Included in the hydrocarbon polymers are the homo- and copolymers of dienes such as polybutadiene and polyisoprene, as well as the copolymers of butadiene and isoprene with styrene. Another preferred group of hydrocarbon polymers responsive to the reinforcement promoters of this invention is the group of hydrocarbon polymers containing low to moderate amounts (<10 weight percent) of polar comonomers such as vinyl acetate and ethyl acrylate.

Specifically preferred are the commercially available, normally solid, grades of HDPE (high-density polyethylene), PP (polypropylene), EPR and EPDM (ethylene/propylene rubbers), polyisoprene, polybutadiene and polybutadiene/styrene polymers. A most preferred thermoplastic polymer is high-density polyethylene having a density of about 0.94 to about 0.96 and a melt index of about 0.01 to about 20, preferably 0.05 to 10.

Filler

The inorganic fillers that may be used in the compositions of the present invention are finely divided inorganic materials of natural or synthetic origin. The fillers may be particulates, platelets, fibers or fibrils, they may be regular or irregular in shape, and they may be amorphous or crystalline. Most of these fillers are generally considered to be "inert" when used in the preferred polymers of this invention, i.e., non-reinforcing in the sense that although they normally increase the stiffness (modulus) and often reduce the volume cost of a plastic composite, other properties such as strength and ductility are adversely affected, often to a severe degree. The reinforcement promoters of the present invention offset these negative effects by improving specifically the strength and ductility properties of such composites.

Illustrative of the natural silicates is Kaolinite, also known as China Clay, which may be used either in a natural ("hydrous") form or in a dehydrated ("calcined") form. Examples of other common clay minerals are feldspar, nepheline, montmorillonite, bentonite and attapulgite. Other typical natural silicates are talc, mica, wollastonite and asbestos. Various synthetic silicates are commonly used as fillers in elastomers such as, for example, precipitated calcium and aluminum silicates. Special silicates such as the natural and synthetic zeolites are sometimes used in polymer-bonded compositions where good mechanical properties are important for proper performance. Examples of expanded silicates are perlite and vermiculite. Illustrative of silica fillers are pyrogenic or fumed silica, precipitated or hydrated silica, vitreous or fused silica, and various natural silica fillers such as quartz, novaculite, tripoli and diatomite. Illustrative of carbonate mineral fillers are the natural calcite, dolomite, and limestone products (calcium and magnesium carbonates) which may be ground or provided in precipitated ("synthetic") forms. Illustrative of metal oxides and hydroxides are alumina, gibbsite, precipitated aluminum trihydrate, magnesium hydroxide, manganese oxides, titanium dioxide, various iron oxides and hydroxides, zinc oxide and zirconium oxide. Illustrative of ceramic fillers are barium titanate, barium ferrite and neodynium titanate. Illustrative of sulphate fillers are baryte and gypsum. Other illustrative fillers are fibers made from glass, basalt and other molten glasses, such as furnace slag. The average particle size of the filler is usually up to 100 μm, and preferably less than 30 μm.

Interfacial Agents

The interfacial agents of the present invention must satisfy certain criteria in order to provide for the synergistic reinforcement promotion of the filled polymer composition. These criteria are:

(1) The interfacial agents must be capable of copolymerizations with each other by addition or condensation polymerization reactions between chemically reactive groups;

(2) One of the interfacial agents is more highly adsorbable onto the filler surface while the other interfacial agent is more highly soluble in the filled polymer;

(3) One of the interfacial agents must contain at least one reactive olefinic double bond capable of mechanicochemical grafting to the polymer during melt processing.

In cases where copolymerization between the interfacial agents are impossible, synergistic systems have not been found. In cases where copolymerization is possible, the extent of synergy can be determined from an empirical index, S, defined as follows:

$$S = 50(Q_A + Q_S - 0.2)(1 - 10 R_f^o)(0.5 - \Delta^2) \quad (A)$$

wherein $Q_A$ and $Q_S$ are the Alfrey-Price resonance parameters of the most reactive olefinic double bonds in the adsorbable and soluble agents, respectively; $R_f^o$ is the relative flow ratio of the adsorbable agent measured by thin layer chromatography on a neutral silica gel using xylene as the eluant and di-n-butyl fumarate as the standard; and $\Delta$ is the difference between the Hildebrand solubility parameters of the soluble agent and that of the polymer, respectively. The synergy index is a quantitative statement of the criteria outlined qualitatively above. In Equation (A), the synergy index, S, has a value greater than 0, preferably greater than 2 and most preferably greater than 10.

In Equation (A), Q is commonly used for characterizing the resonance effect for monomers used in copolymerization. A detailed description of the Q concept is presented by T. Alfrey, Jr., and L. J. Young in *Copolymerization* at Chapter 2, pages 67 to 87, 1964, and in the references listed at the end of the chapter. An extensive tabulation of Q-values for monomers is given by L. J. Young at pages II-3872, II-404 in the second edition of *Polymer Handbook*, edited by J. Brandrup and E. H. Immergut, Interscience, New York, 1975. The agents in Equation (A) cannot in general be found in such tables, however, Q-values for interfacial agents may be estimated from the values of monomers having closely similar olefinic double bonds structures. Where the Q-values have not been tabulated for any closely similar structures, the values can be determined experimentally using the procedures set forth in the Brandrup and Immergut handbook and the references cited therein. The Q parameter requires that least one interfacial agent must contain olefinic double bonds having a sufficiently high Q-value to accomplish mechanochemical grafting to the hydrocarbon polymer during conventional compounding and processing operations. The Q-value in Equation (A) reflects the experimental finding that the total Q-values for all the reactive olefinic bonds should be greater than 0.2, and preferably each Q-value should be at least 0.1. The term "reactive" covers those olefinic double bonds which exhibit Q-values which satisfy Equation (A) to provide a positive synergy index.*

*The term "mechano-chemical grafting" refers to mechanically induced chemical reactions principally caused by free radical formation due to rupture of polymer chains during melt processing. See, for example, G. Kraus (editor), *Reinforcement of Elastomers*, New York, 1965 (Interscience).

The $R_f^o$ parameter in Equation (A) of the relative flow ratio, $R_f^o$, is a measure of the adsorptivity of a interfacial agent onto highly polar mineral surfaces. Many interactions between organic compounds and solid surfaces are highly specific, in that one mineral may result in chemical bonding whereas another mineral may result in adsorption through dipole/dipole interactions. However, for the purpose of the present invention, the requirement of adsorptivity is for convenience expressed in terms of the relative flow ratio of the adsorable agent measured by thin layer chromatography on a neutral silical gel using xylene as the eluant and di-n-butyl fumarate as the standard. The silica gel is a convenient representation of a filler (silica) in a hydrocarbon polymer (xylene). Xylene is preferred over the simple aliphatic hydrocarbons because it is a better solvent for polar chemicals and the agents must be dissolved in order to perform the chromatographic adsorptivity test. The $R_f^o$ term assures that the interfacial agent molecule will adsorb sufficiently onto the filler surface so as to effectively contribute to the morphological change required in the polymer layer immediately adjacent to the filler particle. The relative flow ratio, $R_f^o$ which is used as the chromatographic adsorption parameter, is defined as the ratio of advancement of the dissolved agent relative to the advancement of the solvent front in a conventional thin-layer chromatography test such that the greater the adsorptivity of the agent, the lower the flow ratio. The $R_f^o$ parameter used in Equation (A) is defined as the ratio of the flow ratio for the agent being tested, $R_f$, relative to the flow ratio of a standard compound, $R_{fs}$, as follows:

$$R_f^o = R_f / R_{fs} \quad (B)$$

The chemical standard selected for purposes of the present invention is di-n-butyl fumarate. Background concerning chromatographic techniques and concepts is provided by L. R. Snyder, in *Principles of Adsorption Chromatography*, Marcel Dekker Inc., (New York), 1968. A specific reference to thin layer plate techniques using particular material coatings on glass plates is presented by J. G. Kirchner, J. N. Miller, and G. J. Keller, in *Analytical Chemistry*, Volume 23, at pages 420–425, March 1951.

The $R_f^o$ term in Equation (A) requires that the adsorptivity of the interfacial agent must be appreciable greater than that of di-n-butyl fumurate under the stated conditions. This is evident since, for S to remain positive, the relative flow ratio expression in Equation (A), $1 - 10 R_f^o$, must be positive such that the algebraic requirement is for $R_f^o$ to be less than 0.1. The $R_f^o$ term in Equation (A) should, therefore, be as small as possible, preferably less than 0.05, and most preferably no more than 0.01. It is not critical, although often desirable, that the interfacial agent have a specific or chemical bonding interaction with the filler surface in a given filled polymer composition.

The $\Delta$ term in Equation (A) is the difference between the Hildebrand solubility parameters of the soluble agent, $\delta_s$, and of the polymer $\delta_p$, in that:

$$\Delta = (\delta_s - \delta_p) \quad (B)$$

A list of $\delta_p$ values, i.e., Hildebrand solubility parameters, for some typical hydrocarbon polymers is given in the following table:

TABLE A

| Hydrocarbon Polymer | Hildebrand Solubility Parameter, $\delta_p$ |
|---|---|
| Polybutadiene | 7.7 |
| Polyisobutylene | 8.2 |
| Polyisoprene | 8.3 |
| Polyethylene | 8.3 |
| Polypropylene | 9.0 |

In the case of copolymers, the Hildebrand solubility parameter is calculated using the "rule of mixtures" based on the mole-fractions of the various monomer constituents. The Δ-term in Equation (A) requires that the soluble interfacial agent have a solubility parameter which is substantially similar to that of the particular hydrocarbon polymer.

The "adsorbable" agent in a synergistic combination is the agent having the lowest $R_f^o$-value, i.e., the highest adsorptivity. The "soluble" agent in turn is generally the agent having the smallest Δ, i.e., the solubility parameter closest to the polymer solubility parameter. In most cases of synergistic combinations, the most soluble agent will be the least adsorbable and vice versa. However, in cases where this is not the case, the agent with the lowest $R_f^o$-value is by definition the "adsorbable" agent and the other agent is by definition the "soluble" agent, no matter what the solubility parameter difference may be. The reason for this is that "soluble" in the context of this invention refers to the solubility of an interfacial agent in a filled rather than in an unfilled polymer. If a component is most strongly adsorbed onto the mineral filler surface, the concentration of that component in the matrix resin will be reduced due to the adsorption. These rules hence apply to the identification of the "adsorbable" and the "soluble" interfacial agent values to be inserted in the formula for the synergy index S.

It is to be understood that the synergy index, S, have a positive value only by having all the factors in Equation (A) being positive. Therefore, situations where S becomes positive by virtue of two of the factors being negative is not within the definition of a "positive synergy index". In other words, for the synergy index to be positive under the definition of the present invention, three conditions must be satisfied, in that each expression in Equation (A) must be individually satisfied as having a positive value.

A listing of the pertinent parameters for a representative selection of some interfacial agents is given in Table B below:

TABLE B

| Interfacial Agent | Designation | Olefinic bonds, n | Resonance, Q | Relative flow ratio, $R°_f$ | Solubility Parameter $\delta$ |
|---|---|---|---|---|---|
| Trimethylolpropane triacrylate | TTA | 3 | 0.4 | 0.12 | 8.9 |
| Triacryloyl hexahydro-s-triazine | TAHT | 3 | 1.3 | 0.01 | 10.4 |
| Stearic acid | STA | 0 | 0.0 | 0.06 | 8.2 |
| γ-tetramethacryloxypropyl silane | 4GMP | 4 | 0.7 | 0.07 | 8.0 |
| γ-trimethacryloxypropyl methoxy silane | 3GMPM | 3 | 0.7 | 0.08 | 8.2 |
| γ-dimethacryloxypropyl dimethoxy silane | 2GMP2M | 2 | 0.7 | 0.09 | 8.3 |
| γ-methacryloxypropyl trimethoxy silane | GMP3M | 1 | 0.7 | 0.10 | 8.6 |
| tetramethyl silicate | 4M | 0 | 0.0 | 0.00 | 9.3 |
| γ-trimethacryloxypropyl methoxy silane hydrolyzate | 3GMP-H | 3 | 0.7 | 0.01 | 8.6 |
| γ-dimethacyloxypropyl dimethoxy silane hydrolyzate | 2GMP2M-H | 2 | 0.7 | 0.00 | 9.5 |
| γ-methacryloxypropyl trimethoxy silane hydrolyzate | GMP3M-H | 1 | 0.7 | 0.00 | 11.6 |
| tetramethyl silicate hydrolyzate | 4M-H | 0 | 0.0 | 0.00 | 18.8 |

For non-polar polymers, such as the various hydrocarbon polymers of the present invention, where specific interactions inherently are absent, the so-called Hildebrand solubility parameter is an excellent measure of solubility or compatibility for added interfacial agents. The solubility parameter for polyethylene, for example, is about 8.3 and the closer to this value the solubility parameter for an interfacial agent is, the better the solubility in unfilled polyethylene. For a general discussion of the Hildebrand solubility parameter concept and the means for calculating it using the method of group contributions, which is particularly valuable for uncommon molecular structures such as those of many reinforcement promoters, see O. Olabisi et al., *Polymer-Polymer Miscibility*, Chapter 2.3, pages 47–63, New York, 1979, and the references cited therein. It is understood that solubility of an interfacial agent in a polymer for the purpose of this invention always refers to the molten or amorphous polymer. Hence, even though some of the hydrocarbon polymers of this invention are partially crystalline at room temperature, the amorphous densities must be used when calculating the solubility parameters. A group contribution for silicon of 32 cal.$^{\frac{1}{2}}$ cm$^{3/2}$/mole was calculated from a published value of the solubility parameter for polydimethylsiloxane of approximately 7.5 cal.$^{\frac{1}{2}}$ cm$^{-3/2}$, and from published group contribution values. This value for silicon was used in calculating the δ-values for silanes listed in Table B. Since there are some differences in numerical solubility parameters and group contributions among various authors, it is noted that for the purpose of the present invention, such values are to be obtained from those listed in or referenced from D. W. Krevelan, *Properties of Polymers*, Amsterdam/New York, 1976.

If an interfacial agent having excellent adsorptivity towards polar mineral surfaces but poor solubility in non-polar hydrocarbon media, such as heptane and polyethylene, e.g., 1,3,5 triacryloyl hexahydro-s-triazine (TAHT), is used in combination with an interfacial agent having only fair adsorbtivity but good solubility in non-polar hydrocarbon media, e.g., trimethylolpropane triacrylate (TTA), a filled polymer composition is obtained which has far superior properties as compared to those compositions obtained using either interfacial agent alone.

Preferred interfacial agents include reinforcement promoters, such as those designated in copending application Ser. No. 295,811, entitled "Reinforcement Promoters for Filled Thermoplastic Polymers", filed concurrently with this application.

Preferred reinforcement promoters include those chemicals having the following structure:

$$R^1+(X)_{\overline{m}}C=C]_n \quad (C)$$
$$\begin{array}{cc} | & | \\ R^3 & R^4 \end{array}$$
with $R^2$ on the first carbon wherein $R^1$ is an organic group free of olefinic or acetylenic unsaturation having a valence of n; $R^2$, $R^3$ and $R^4$ are hydrogen, carboxy or monovalent organic groups free of olefinic or acetylenic unsaturation; X is:

$$-\underset{\underset{H}{|}}{N}-\underset{\|}{\overset{O}{C}}-, \quad -O-\underset{\|}{\overset{O}{C}}- \text{ or } -\underset{\|}{\overset{O}{C}}-;$$

m has a value of 0 or 1; and n has a value of at least two, and preferably from 3 to 5. When m is zero, $R^1$ preferably has a double or triple bond which is in conjugated with the olefinic double bond, and which is electron withdrawing. When m is one, X preferably has a similar conjugated double bond structure providing an electron withdrawing effect on the olefinic double bond. Illustrative of the group represented by $R^1$ are heterocyclic groups consisting of carbon, hydrogen and nitrogen, e.g., s-triazine and diaminopyridine where the free valences are on nitrogen; polyvalent hydrocarbon groups, such as alkylene, phenylene, or a group derived from polyhydroxy alkanes by the removal of the hydroxyl groups such as contained in the condensation products of acrylic and maleamic acids with aliphatic, aromatic or heterocyclic polyols; or acrylamides, maleimides and maleamic acids of aliphatic, aromatic and heterocyclic polyamines. Particularly preferred reinforcement promoters are those chemicals listed in Table C below:

TABLE C

| Designation | m | n | R¹ | R² | R³ | R⁴ | X |
|---|---|---|---|---|---|---|---|
| TTA | 1 | 3 | $CH_3CH_2C(CH_2\!\!-\!\!)_3$ | H | H | H | $-O-\overset{\overset{O}{\|}}{C}-$ |
| PETA | 1 | 3 | $(CH_2)_3C-CH_2OH$ | H | H | H | $-O-\overset{\overset{O}{\|}}{C}-$ |
| PBM | 1 | 2 |  | H | H | H | $-O-\overset{\overset{O}{\|}}{C}-$ |
| DPEPA | 1 | 5 |  | H | H | H | $-O-\overset{\overset{O}{\|}}{C}-$ |
| MTA | 1 | 3 |  | H | H | H | $-O-\overset{\overset{O}{\|}}{C}-$ |
| TAHT | 1 | 3 |  | H | H | H | $-\overset{\overset{O}{\|}}{C}-$ |
| MADMA | 1 | 2+x |  | H | H | COOH | $-\overset{H}{\underset{\|}{N}}-\overset{\overset{O}{\|}}{C}-$ |
| TTM | 1 | 3 | $CH_3CH_2C(CH_2\!\!-\!\!)_3$ | H | H | COOH | $-O-\overset{\overset{O}{\|}}{C}-$ |
| TMHT | 1 | 3 |  | CH₃ | H | H | $-\overset{\overset{O}{\|}}{C}-$ |
| TADAP | 1 | 4 |  | H | H | H | $-\overset{\overset{O}{\|}}{C}-$ |

The most preferred adsorbable interfacial agents are TAHT, MTA, ELA, TADAP and the hydrolyzed alkoxy silanes such as GMP3M-H.

The most preferred soluble interfacial agents are TTA and other di-, tri- and polyhydroxylic acrylates and maleates and the unhydrolyzed alkoxy silanes such as 3GMPM and 2GMP2M.

So-called silane coupling agents and related silicate esters typically include the free radical polymerizable, unsaturated, hydrolyzable silanes containing at least one silicon-bonded hydrolyzable group, e.g., alkoxy, halogen, acyloxy, and the like, and at least one silicon-bonded organic radical containing at least one reactive olefinic double bond such as vinyl, gamma-methacryloxypropyl, gamma-acryloxypropyl, allyloxypropyl, ethynyl, 2-propynyl and others. Any remaining valences of silicon not satisfied by a hydrolyzable group or a reactive olefinic double bond group being satisfied by a monovalent hydrocarbon group, such as methyl, ethyl, propyl, isopropyl, butyl, pentyl, isobutyl, isopentyl, octyl, decyl, cyclohexyl, cyclopentyl, benzyl, phenyl, phenylethyl, naphthyl, and the like. Suitable silanes of this type include those represented by the formula:

$$R_aSiX_bY_c \quad (B)$$

wherein R is a monovalent hydrocarbon group; X is a silicon-bonded hydrolyzable group; Y is a silicon-bonded monovalent organic group containing at least one reactive olefinic double bond; a is an integer of 0 to 2, preferably 0; b is an integer of 1 to 3; and c is an integer of 1 to 3; as well as the hydrolyzates of such silanes and/or the condensates of such hydrolyzates.

Examples of free radical polymerizable unsaturated hydrolyzable silanes that can be used in this invention include:

γ-trimethacryloxypropyl methoxy silane (3GMPM)
γ-triacryloxypropyl methoxy silane (3GAPM)
γ-dimethacryloxypropyl dimethoxy silane (2GMP2M)
γ-diacryloxypropyl dimethoxy silane (2GAP2M)
γ-methacryloxypropyl trimethoxy silane (GMP3M)
γ-acryloxypropyl trimethoxy silane (GAP3M)

Preferred silanes are those for which the Q-value of at least one of the olefinic double bonds is greater than 0.2, preferably greater than 0.4. However, for special purposes, silanes containing no olefinic double bonds may be included in certain synergistic combinations because of the copolymerization mechanism of condensation inherent in alkoxy silanes. Examples of such silanes are:

γ-aminopropyl triethoxy silane
γ-mercaptopropyl trimethoxy silane
γ-glycidoxypropyl trimethoxy silane Silane coupling agents are currently used, for example, in treating fiberglass and the like. Under the present invention, by combining adsorbable and soluble interfacial agents, based on the solubility data and adsorptivity data from Table B, it becomes evident that alkyl silicates combined with tri-, di- or mono-alkoxysilane (in order of increasing effectiveness) provide superior reinforcement promotion than the single-component tri-alkoxy silanes. Similarly, superior performance can be obtained from combining a neat silane with mono-, di- or tri-alkoxy silanes (in order of increasing effectiveness). The best silane/organic combinations of interfacial agents are those of a more highly adsorbable silane, such as a hydrolyzed tri-alkoxy silane, with a soluble organic reinforcement promoter, such as TTA. The more polyolefin-compatible silanes, in contrast, will show the highest levels of synergy when combined with the highly polar and firmly adsorbed reinforcement promoters, such as TAHT, MTA, ELA and TADAP.

The proportions of the three types of components in the reinforced, filled hydrocarbon polymer of the present invention are from about 0.1 to 5.0 weight percent, preferably about 0.5 to 2.0 weight percent, of the interfacial agent combination; about 10 to 90 weight percent, preferably 10 to 60 weight percent, of the filler; and about 10 to 90 weight percent, preferably about 40 to 90 weight percent, of the hydrocarbon polymer. These percentages are based on the total amount of interfacial agents, filler and hydrocarbon polymer in the composition. The proportions of interfacial agents will vary depending upon the combination of interfacial agents in different ratios depending upon the synergistic benefits of having one agent in proportionately greater amounts than the other. A preferred ratio range is from 1:10 to 10:1, preferably 1:4 to 4:1.

Adjuvants

Other adjuvants which may be employed in the compositions of the present invention include curing agents; flame retardant additives; blowing agents; nucleating agents for blown systems; lubricants; UV stabilizers; dyes and colorants; voltage stabilizers; metal deactivators; and traditional coupling agents. These adjuvants would be used in amounts designed to provide the intended effect in the resulting composition. The total amount of adjuvants would usually range from 0 to about 60 weight percent based on the total weight of the reinforced, filled thermoplastic composition. Where the adjuvants are compounds which may interfere with a performance of the reinforcement promoter agents; they should be added subsequent to the formation of the reinforced, filled thermoplastic composition. If there is no significant interaction to inhibit the performance of the reinforcement promoter agents, the adjuvants may be added at any time based on the established procedures of the prior art.

Process

In an embodiment of the process of the present invention, the interfacial agents can be applied using an organic solvent directly onto the filler prior to compounding with the polymer. This is done to avoid possible spurious effects caused by the often significant differences in the physical characteristics, such as melting points, boiling points, viscosities, and the like, among the various interfacial agents. Nevertheless, in actual practice other means of incorporating the interfacial agents are often preferable, both from a manufacturing and from a cost viewpoint. For example, the interfacial agents may be incorporated directly into the filler-polymer mixture at the time of compounding, i.e., integral blending; they may be incorporated by dissolving, emulsifying or dispersing one agent of the synergistic combination in the other agent rather than in a solvent; they may be incorporated by emulsifying or dispersing either or both agents in water, and then applying as a pretreatment to the filler; or by any other procedure established in the art depending on the nature of the particular synergistic combination. Due to the complementary nature of the agents in synergistic reinforcement promotion, one particularly attractive process will often be to pretreat the filler with the adsorptive interfacial agent and to incorporate the soluble interfacial agent into the polymer. This will enable the synergistic interaction to take place under the most favorable conditions during subsequent compounding.

It is preferred that the composition and processing be conducted in the substantial absence of free radical initiators and antioxidants or their residue to the extent that the presence of such chemicals would interfere with the reinforcement promotion by the interfacial agents.

Mechanism

Without wishing to be bound to any particular theory or mechanism, it is believed that the reason for the outstanding performance of these interfacial agents is that they result not only in achieving excellent bonding between the filler particles and the surrounding polymer matrix, but in particular because they achieve morphological changes in the interfacial domains, thereby modifying the polymer layer next to the filler surface so that it becomes both stronger and tougher than the bulk polymer further away from the filler particles. As a result, the high levels of local stress concentrations, which are invariably present due to the introduction of hard inclusions—i.e., "flaws"—in the polymer, are more than compensated for by these improvements in the mechanical properties of the interface. It has been discovered that the mere combination of coupling and decoupling agents generally does not result in a composite retaining the best properties for both agents. Example 1 below demonstrates that when a reinforcement promoter with strong coupling character, such as TTA, is combined with a typical decoupling agent, such as STA, the result is a decrease in tensile strength without any gain in elongation at break. Hence, the STA decoupling agent interferes with the coupling effect of the TTA coupling agent without providing any compensating improvement in ductility. Furthermore, it has been discovered that arbitrary combinations of reinforcement promoters generally do not result in improvements in composite properties beyond those expected from the rule of mixtures, i.e., without synergy.

It is believed that the synergy effect is related to the mechanism of the formation of a tough, polymer interface which is necessary for achieving the simultaneous improvement in strength and ductility in a filled polymer composition. The combination of two copolymerizable interfacial agents in such a way that one is strongly adsorbed into the filler surface, whereas the other is more highly soluble in the polymer matrix, result in increased opportunity for copolymerization and grafting in the interface region surrounding each filler particle. Although many aspects of filler reinforcement mechanisms in polymers are still unresolved, as well as the subject of controversy in the art, it is suggested that the unexpected and dramatic synergistic effect provided by the present invention are related to a mechanism whereby an unusually strong and tough filler/polymer interface is formed.

EXAMPLES

The following examples illustrate the effect of the synergistic combinations of interfacial agents of the present invention. Unless otherwise indicated, the procedure for making treated, filled hydrocarbon polymer compositions was as follows.

The filler pretreatment procedure consisted of dissolving about 10 g of interfacial agents in enough solvent, e.g., acetone, to dissolve the promoter, but less than the amount of solvent which would produce a paste with the wetted filler. The agent solution was then added to 500 g of filler, blended mechanically and air dried overnight.

The pretreated filler was compounded with 250 g of thermoplastic polymer on a 6" by 12" 2-roll mill at 180° C. by adding 250 g of pretreated filler incrementally to the fluxed polymer. Mixing was continued using thorough compound procedures. Treated, filled polymer compound was then sheeted off the mill and rolled into a cylindrical bar, i.e., "pig", and then passed end-wise through the compounding mill about ten times for a total mixing time of ten minutes after all the filler had been added. The product composition was then sheeted off the mill, allowed to cool to room temperature and granulated in a granulator.

The following testing procedures were used for each product composition. The granulated product composition was injection molded at a melt temperature of 215° C. using a 38 cm³ capacity, 30 ton reciprocating screw-injection machine with a mold providing an ASTM dog bone test bar with dimensions of 2" by ½" by ⅛" for testing tensile properties, and a rectangular bar with dimensions of 5" by ½" by ⅛" for testing flexural properties. The following tests were used for each product composition:

| Property Tested | ASTM Test Designation |
|---|---|
| Tensile Strength | |
| Tensile Modulus | |
| Elongation at Yield | D638-76 |
| Elongation at Break | |
| Flexural Strength | |
| Flexural Modulus | D790-71 |
| Izod Impact Strength | D-256-73 |
| Heat Distortion Temperature | D-648-72 |

During the tension and flexural tests a cross-head speed of 0.2" per minute was utilized.

The compound designations used in the examples are defined as follows:

| Designation | Description |
|---|---|
| ATH | Alumina trihydrate having an average particle size of 0.3 to 1.0 μm and a surface area of about 6 to 15 m²/g. |
| Clay I | An unmodified, hard clay consisting of a hydrated kaolin with a mean particle size of 0.3 μm and a surface area of 20 to 24 m²/g. |
| GMP3M-H | γ-methacryloxypropyl trimethoxy silane hydrolysate. |
| HDPE | A high density polyethylene having a density of 0.959 and a melt index of 0.7. |
| STA | Stearic acid. |
| TAHT | Triacryloyl hexahydro-s-triazine. |
| TTA | Trimethylolpropane triacrylate. |

EXAMPLE 1

This example illustrates the lack of synergy between a reinforcement promoter, TTA, and a decoupling agent, STA, when used in a HDPE composition containing 50 weight percent ATH. The sample preparation and testing was done as described above. The results of the physical testing of the compositions are shown in Table 1:

TABLE 1

| Filler Treatment wt % on Filler | | Tensile Strength | Tensile Modulus | Elongation at Break | Izod Impact |
|---|---|---|---|---|---|
| TTA | STA | psi | ksi | (%) | (ft. lbs/in.) |
| 0.0 | 0.0 | 3430 | 292 | 4 | 1.9 |

TABLE 1-continued

| Filler Treatment wt % on Filler | | Tensile Strength | Tensile Modulus | Elongation at Break | Izod Impact |
|---|---|---|---|---|---|
| TTA | STA | psi | ksi | (%) | (ft. lbs/in.) |
| 2.0 | 0.0 | 6380 | 370 | 13 | 2.1 |
| 1.0 | 1.0 | 5400 | 293 | 9 | 1.5 |
| 0.0 | 2.0 | 3230 | 289 | 68 | 4.7 |

The results of Table 1 show that the one to one combination of the decoupling agent, STA, and the reinforcement promoter, TTA, results in a composition having properties inferior to those compositions containing each interfacial agent alone. Tensile strength, tensile modulus, elongation at break and impact strength are inferior to those properties using TTA alone, and elongation at break and impact strength are inferior to those properties using STA alone. This is typically the case where no possibility exists for a chemical reaction to occur between the two interfacial agents. In this case the synergy index, S, is not defined since copolymerization between TTA and STA is not possible.

EXAMPLE 2

This example illustrates an embodiment of the present invention using a soluble interfacial agent, TTA, and an adsorbable interfacial agent, GMP3M-H, which are capable of copolymerization by free radical addition polymerization. The composite was a 60 weight percent ATH-filled HDPE. Sample preparations and testing were conducted as in Example 1. The mechanical properties of the compositions are shown in Table 2 as follows:

TABLE 2

| Filler Treatment wt % on Filler | | Tensile Strength | Tensile Modulus | Elongation at Break | Izod Impact |
|---|---|---|---|---|---|
| TTA | GPM3M-H | psi | ksi | (%) | (ft. lbs/in.) |
| 0.0 | 0.0 | too stiff to mold | | | 1.8 |
| 1.0 | 0.0 | 4350 | 350 | 10 | 1.8 |
| 1.0 | 0.0 | 4110 | 339 | 5 | 1.1 |
| 0.75 | 0.25 | 4570 | 366 | 36 | 4.7 |
| 0.5 | 0.5 | 4590 | 364 | 30 | 5.0 |
| 0.5 | 0.5 | 5070 | 405 | 46 | 6.2 |
| 0.25 | 0.75 | 4330 | 350 | 53 | 4.2 |
| 0.0 | 1.0 | 4090 | 337 | 28 | 1.9 |

The data in Table 2 shows that a combination of TTA; GMP3M-H within a ratio range of about 3:1 to 1:3 results in mechanical properties radically superior to those achievable with either interfacial agent alone. The maximum impact strength is particularly enhanced, while tensile strength, tensile modulus and elongation at break all show significant improvements.

The synergy index for TTA/GMP3M-H in polyethylene is:

$$S = 50(0.7 + 0.4 - 0.2)(1 - 10 \times 0.01)(0.5 - 0.3^2) = 16.6$$

i.e., a high positive value.

EXAMPLE 3

This example shows another embodiment of the present invention using a soluble interfacial agent, TTA, and an absorbable interfacial agent, TAHT, capable of copolymerization by free radical addition reaction. The composite was HDPE containing 50 weight percent Clay I. The example preparation in testing was conducted as in Example 1, except that TTA was added (integrally blended) to the resin/filler blend at the time of melt compounding. The results of the mechanical testing of the compositions is shown in Table 3 below:

TABLE 3

| Filler Treatment wt % on Filler | | Tensile Strength | Tensile Modulus | Elongation at Break | Izod Impact |
|---|---|---|---|---|---|
| TTA | TAHT | psi | ksi | (%) | (ft. lbs/in.) |
| 0.0 | 0.0 | 3690 | 284 | 8 | 0.6 |
| 0.0 | 2.0 | 5060 | 340 | 28 | 3.6 |
| 2.0 | 1.5 | 5570 | 387 | 34 | 3.3 |
| 2.0 | 0.5 | 6210 | 406 | 27 | 3.1 |
| 2.0 | 0.0 | 5080 | 372 | 11 | 1.8 |

The results show that the TTA:TAHT composition provides a superior combination of tensile strength, tensile modulus, and elongation at break than either interfacial agent by itself. The optimum ratio of TTA:TAHT is around 2:1. The impact strength is maintained near the superior value obtained using TAHT alone for this composition. The example illustrates a dramatic case of synergism between two reinforcement promoters, even when both exhibit desirable reinforcement promotion when used by themselves.

The synergy index in this case is:

$$S = 50(1.3 + 0.4 - 0.2)(1 - 10 \times 0.01)(0.5 - 0.6^2) = 9.5$$

i.e., a high positive value.

It is claimed:

1. A composition essentially free of free radical initiators comprising a hydrocarbon polymer, an inorganic filler, and about 0.1 to 5.0 weight percent of two interfacial agents wherein:
   (a) said agents are capable of copolymerization with each other;
   (b) at least one agent contains at least one reactive olefinic double bond capable of mechanico-chemical grafting to the polymer;
   (c) one agent is more highly adsorbable onto the filler surface while the other agent is more highly soluble in the filled polymer; and
   (d) said agents have a synergy index, S, being greater than zero, which is defined by the formula:

$$S = 50(Q_A + Q_S - 0.2)(1 - 10 R_f^\circ)(0.5 - \Delta^2)$$

wherein $Q_A$ and $Q_S$ are the Alfrey-Price resonance parameters of the most reactive olefinic double bonds in the adsorbable and soluble agents, respectively; $R_f^\circ$ is the relative flow ratio of the adsorbable agent measured by thin layer chromatography on a neutral silica gel using xylene as the eluant and di-n-butyl fumarate as the standard, and $\Delta$ is the the difference between the Hildebrand solubility parameter of the soluble agent and that of the polymer.

2. The composition of claim 1 wherein the hydrocarbon polymer is a polyolefin homopolymer or copolymer.

3. The composition of claim 1 wherein the mineral filler is aluminum trihydrate, clay, talc or calcium carbonate.

4. The composition of claim 1 wherein the soluble interfacial agent is trimethylolpropane triacrylate and the adsorptive interfacial agent is either gamma-trimethacryloxypropyl methoxy silane hydrolyzate or 1,3,5-triacryloyl-hexahydro-s-triazine.

5. A reinforced polymer composition comprising a hydrocarbon polymer, and an inorganic filler, wherein the improvement comprises providing two interfacial agents at the boundary between the filler and the polymer, for increasing the strength and ductility of the filled hydrocarbon polymer, wherein:
   (a) said agents are capable of copolymerization with each other;
   (b) at least one agent contains at least one reactive olefinic double bond capable of mechanico-chemical grafting to the polymer;
   (c) one agent is more highly adsorbable onto the filler surface while the other agent is more highly soluble in the filled polymer; and
   (d) said agents have a synergy index, S, being greater than zero, which is defined by the formula:

$$S = 50(Q_A + Q_S - 0.2)(1 - 10R_f^\circ)(0.5 - \Delta^2)$$

wherein $Q_A$ and $Q_S$ are the Alfrey-Price resonance parameters of the most reactive olefinic double bonds in the adsorbable and soluble agents, respectively; $R_f^\circ$ is the relative flow ratio of the adsorbable agent measured by thin layer chromatography on a neutral silica gel using xylene as the eluant and di-n-butyl fumarate as the standard, and $\Delta$ is the the difference between the Hildebrand solubility parameter of the soluble agent and that of the polymer.

6. A process for making a reinforced, filled polymer composition comprising:
   (a) admixing an inorganic filler or hydrocarbon polymer with two interfacial agents wherein:
      (1) said agents are capable of copolymerization with each other;
      (2) at least one agent contains at least one reactive olefinic double bond capable of mechanico-chemical grafting to the polymer;
      (3) one agent is more highly adsorbable onto the filler surface while the other agent is more highly soluble in the filled polymer; and
      (4) said agents have a synergy index, S, being greater than zero, which is defined by the formula:

$$S = 50(Q_A + Q_S - 0.2)(1 - 10R_f^\circ)(0.5 - \Delta^2)$$

wherein $Q_A$ and $Q_S$ are the Alfrey-Price resonance parameters of the most reactive olefinic double bonds in the adsorbable and soluble agents, respectively; $R_f^\circ$ is the relative flow ratio of the adsorbable agent measured by thin layer chromatography on a neutral silica gel using xylene as the eluant and di-n-butyl fumarate as the standard, and $\Delta$ is the the difference between the Hildebrand solubility parameter of the soluble agent and that of the polymer; and
   (b) compounding the filler, polymer and interfacial agents mixture sufficiently to generate a reinforced, filled hydrocarbon polymer having increased strength and ductility.

7. The process of claim 6 wherein the filler is pretreated with the adsorbable agent, and the soluble agent is incorporated into the polymer, prior to compounding.

* * * * *